Jan. 12, 1932. W. L. SCRIBNER 1,840,638
PROCESS OF ASSEMBLING ROLLER BEARINGS
Filed Aug. 12, 1931
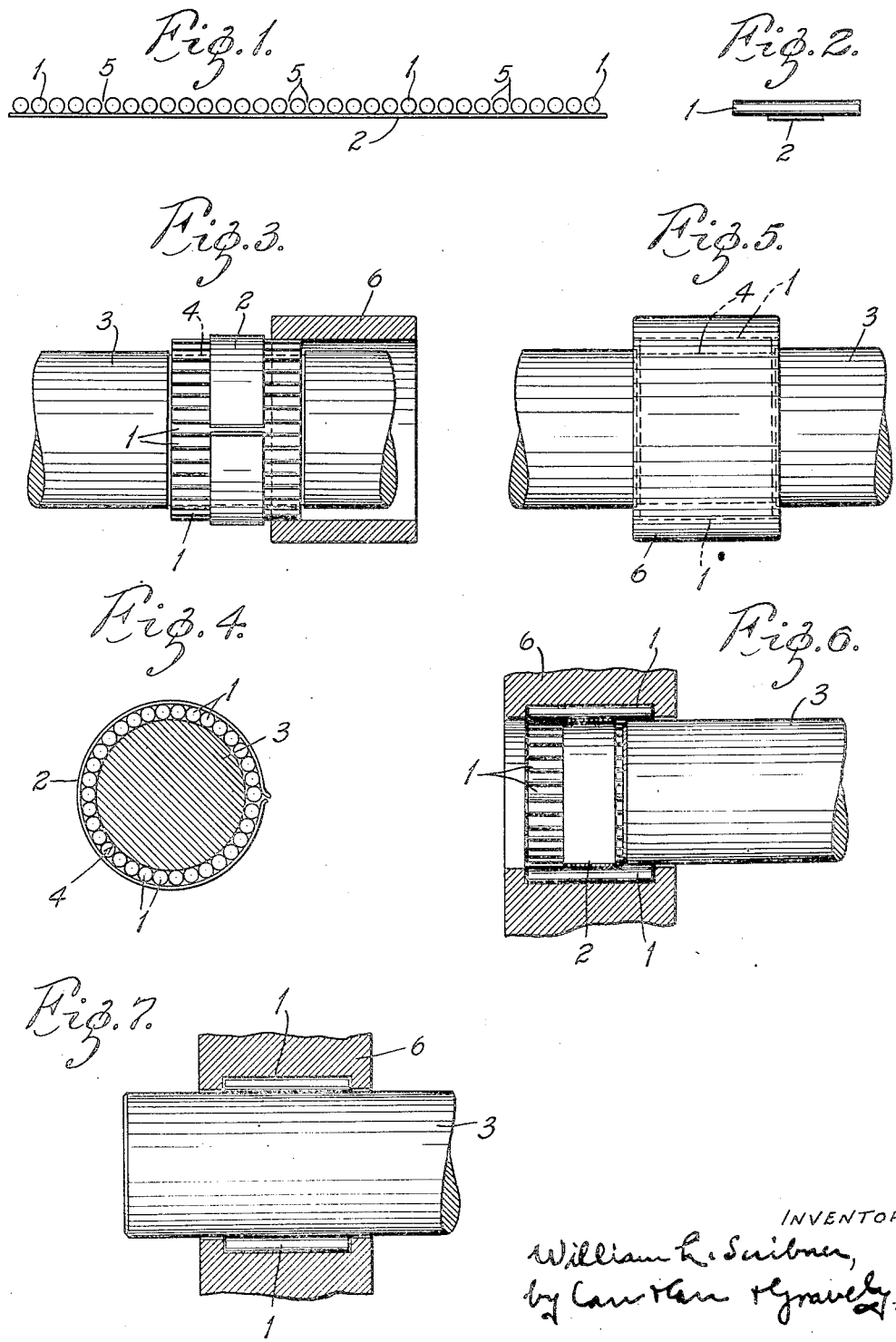
INVENTOR:
William L. Scribner,
by Cauthen & Gravely,
HIS ATTORNEYS.

Patented Jan. 12, 1932

1,840,638

UNITED STATES PATENT OFFICE

WILLIAM L. SCRIBNER, OF CANTON, OHIO, ASSIGNOR TO THE TIMKEN ROLLER BEARING COMPANY, OF CANTON OHIO, A CORPORATION OF OHIO

PROCESS OF ASSEMBLING ROLLER BEARINGS

Application filed August 12, 1931. Serial No. 556,533.

My invention relates to processes of assembling roller bearings, particularly bearings of the kind using a large number of rollers of rather small diameter compared with their length. Such bearings frequently have from forty to one hundred rollers which are small in diameter and quite difficult to handle; and the practice heretofore has been to coat one of the bearing members with heavy grease and imbed the rollers one at a time in said coating of grease. The principal object of the present invention is to avoid this difficult and tedious operation and to provide an assembling process that is simple and economical and that properly positions the rollers on the bearing member. The invention consists principally in securing together a plurality of rollers by a narrow adhesive strip, leaving the end portions of the rollers exposed, positioning the rollers on one of the bearing members, placing the other bearing member in position at one end of the series of rollers so as to hold the rollers, stripping said adhesive strip from the rollers and finally positioning the second bearing member. The invention further consists in the process of assembling roller bearings hereinafter described and claimed.

In the accompanying drawings,

Fig. 1 is a side elevation of a plurality of rollers mounted on an adhesive strip preparatory to assembling by the process embodying my invention, Fig. 2 is an end view, Fig. 3 is an elevation showing a series of rollers mounted on a recessed shaft or inner bearing member and secured together by an adhesive strip, the outer bearing member being positioned over the ends of the rollers, Fig. 4 is a sectional view showing the rollers in position on said inner bearing member, Fig. 5 is a view of the assembled bearing; and Figs. 6 and 7 are longitudinal sectional views showing the process of assembling rollers in a recessed outer bearing member.

As shown in Fig. 1, sufficient rollers 1 to make up a bearing are mounted alongside each other on a suitable strip 2 having an adhesive coating on the side in contact with the rollers. A suitable material is adhesive tape of the cellophane type. The rollers 1 are shown as being slightly spaced apart and the adhesive strip 2 is disposed at about the middle of the rollers, leaving both ends exposed. The rollers illustrated are quite small in diameter and of considerable length and the bearings employing such rollers frequently have from forty to one hundred rollers.

Figs. 1 to 4 illustrate the process of applying such rollers 1 to a shaft 3 which is provided with a recess 4 constituting the raceway or inner bearing member of the bearing. The rollers 1 and strip 2 are wrapped around the shaft 3 with the adhesive strip on the outside of the assembly, the change of the rollers from straight to curved position taking up the original spaces 5 between rollers and leaving them in proper running spacing. After the rollers 1 have been placed on the inner bearing member 4, the outer bearing member 6 is positioned over one end of the assembled series of rollers 1, thus holding them on the inner bearing member. The adhesive strip 2 is then removed from the rollers and the outer bearing member moved into proper position on the rollers.

Where the outer bearing member 6 is provided with the roller receiving recess as shown in Figs. 6 and 7, the rollers 1 are placed in said recess, with the adhesive strip 2 around the inner periphery of the assembled series of rollers. The shaft or inner bearing member 3 is then partly inserted in the rollers to hold them in position, the adhesive strip 2 removed, and the inner bearing member 3 moved endwise into final position. In this internal assembling process, the rollers will be initially placed on the adhesive strip in close contact with each other, the assembling operation spreading the rollers apart slightly to proper running spacing.

The above described process eliminates the necessity of handling the rollers individually and greatly simplifies the operation of assembling the bearing. If desired, the rollers may be placed on an adhesive strip in long lengths and portions cut off from time to time carrying the number of rollers required for a particular bearing.

What I claim is:

1. The improvement in the process of assembling roller bearings which consists in placing said rollers side by side on an adhesive strip with their ends clear of said strip and wrapping said strip of rollers around a bearing member.

2. The improvement in the process of assembling roller bearings which consists in placing said rollers side by side, temporarily securing them together, wrapping said assembled rollers around a bearing member, securing said rollers on said bearing member and removing the temporary securing means.

3. The process of assembling roller bearings which comprises mounting a series of rollers side by side on an adhesive strip extending along the middles of the rollers, positioning said rollers on one race member, positioning a member at one end of the assembled rollers to hold them in place and removing the adhesive strip.

4. The process of assembling roller bearings which comprises mounting a series of rollers side by side on an adhesive strip extending along the middles of the rollers, positioning said rollers on one race member, positioning the other race member at one end of the assembled rollers to hold them in place, removing the adhesive strip and then moving the second race member to final position.

5. The process of assembling rollers on a recessed inner bearing member which comprises wrapping around said inner bearing member a series of rollers held together by an adhesive strip extending along their middles, placing the outer bearing member over the one end of the series of rollers, removing said adhesive strip and then moving the outer bearing member to final position.

6. The process of assembling roller bearings which includes placing in the outer bearing member a series of rollers held together by an adhesive strip extending around the middles, said adhesive strip being located around the inner periphery of the rollers as assembled in the outer bearing member into the end portion of the assembled series of rollers, removing said strip from said rollers and moving the inner bearing member into final position.

Signed at Canton, Ohio, this 3 day of August, 1931.

WILLIAM L. SCRIBNER.